United States Patent
DiMarino

(10) Patent No.: US 12,329,609 B2
(45) Date of Patent: Jun. 17, 2025

(54) IMPRESSION MODEL SYSTEM AND COMPONENTS

(71) Applicant: James DiMarino, Ocean City, NJ (US)

(72) Inventor: James DiMarino, Ocean City, NJ (US)

( * ) Notice: Subject to any disclaimer, the term of this patent is extended or adjusted under 35 U.S.C. 154(b) by 791 days.

(21) Appl. No.: 17/601,257

(22) PCT Filed: Apr. 8, 2020

(86) PCT No.: PCT/US2020/027235
§ 371 (c)(1),
(2) Date: Oct. 4, 2021

(87) PCT Pub. No.: WO2020/210336
PCT Pub. Date: Oct. 15, 2020

(65) Prior Publication Data
US 2022/0175499 A1    Jun. 9, 2022

Related U.S. Application Data

(60) Provisional application No. 62/830,706, filed on Apr. 8, 2019.

(51) Int. Cl.
| | |
|---|---|
| *A61C 13/34* | (2006.01) |
| *A61C 9/00* | (2006.01) |
| *A61C 11/08* | (2006.01) |
| *A61C 13/20* | (2006.01) |

(52) U.S. Cl.
CPC ............ *A61C 9/0006* (2013.01); *A61C 11/08* (2013.01); *A61C 13/20* (2013.01); *A61C 13/34* (2013.01)

(58) Field of Classification Search
CPC ........ A61C 9/0006; A61C 13/20; A61C 13/34
See application file for complete search history.

(56) References Cited

U.S. PATENT DOCUMENTS

| 5,076,785 A | * | 12/1991 | Tsai ..................... A61C 9/0006 433/46 |
| 2006/0008777 A1 | * | 1/2006 | Peterson ............ A61C 13/0019 433/223 |
| 2010/0075273 A1 | * | 3/2010 | Karlsson .............. A61C 9/0006 433/44 |
| 2016/0250004 A1 | * | 9/2016 | DiMarino .............. A61C 19/02 433/34 |

\* cited by examiner

*Primary Examiner* — James Sanders
(74) *Attorney, Agent, or Firm* — Emmett S. Collazo; Jonathan M. Waldman

(57) ABSTRACT

Embodiments of the invention can accommodate multiple variations and goals of impressions, including but not limited to dental and orthodontic models. To adapt embodiments of the invention for multiple purposes, and to standardize the process, embodiments include a housing that allows for impressions to be suspended and/or sealed in the housing so that modelling material can pour up the impression, form a model base or some other type of design, and/or articulate the models if desired, without the need for or with reduced need for trimming and substantial reduction of time and use of modelling material (hereafter "MM") like gypsum, stone, plaster, resin, etc. Embodiments allow models to be created and formed and articulated if desired. Professionals may pour up impressions, form base models, and, optionally, articulate models, allowing less waste, material, and use of time than traditional and current methods.

20 Claims, 11 Drawing Sheets

FIG. 3
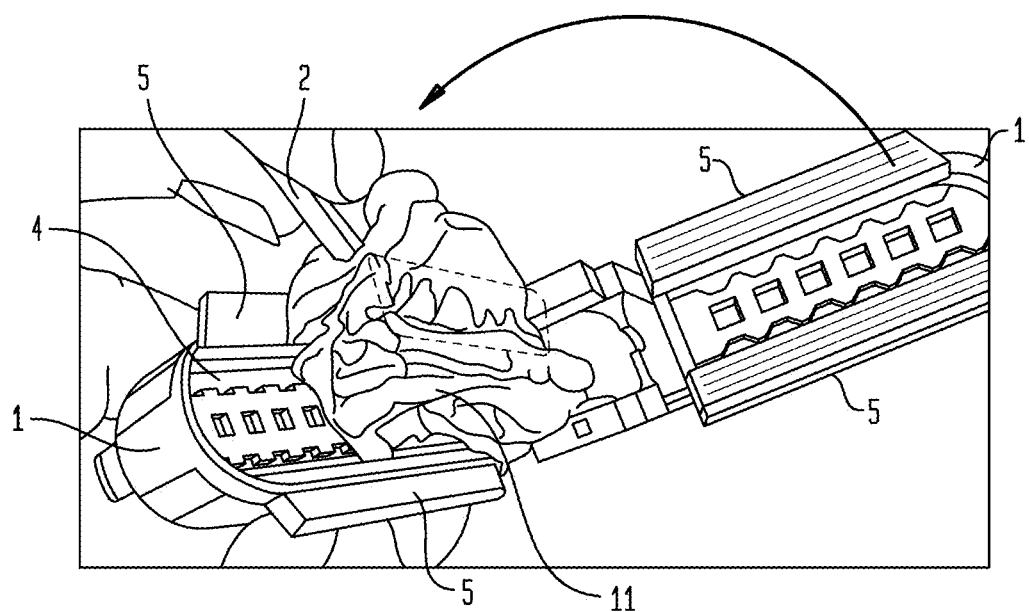
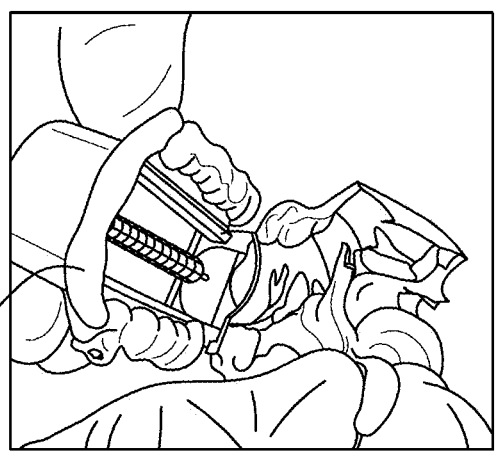

IMPRESSION MODEL SYSTEM AND COMPONENTS

BACKGROUND SECTION

There are several fields in which the embodiment of this invention can be utilized. In the field of dentistry, for example, a dental impression is a negative imprint of hard and soft tissues (teeth and gums, generally) in the mouth from which a positive reproduction of the oral anatomy can be formed. The present invention allows dental professionals to more efficiently create positive reproductions from imprints of single and double arch dental impressions, and from these positive reproductions, pour up impressions, form model bases, and articulate the models if desired in fewer steps than are currently used in the profession, and with less waste.

DESCRIPTION OF RELATED ART

Using dentistry as an example, the current state of the art for processing dental impressions includes multiple steps for pouring up single arch or double arch impressions, creating castings, forming one of several types of model bases, and/or articulating models.

Generally, to begin the process, a dentist or dental technician may take a single or dual arch impression or digital scan(s) or use some other means to create the impression of the desired anatomy/geometry to reproduce. Often 3 impressions or multiple scans are required per patient: a maxillary arch impression/scan, a mandibular arch impression/scan, as well as a bite registration impression/scan.

Dual arch impression trays allow the patient to bite into impression material carried by the impression tray to capture the maxillary, mandibular, and bite registration impressions simultaneously. Single arch impression trays require three steps, a single arch maxillary impression, a single arch mandibular impression, and a bite registration impression to capture the same information.

Subsequent steps include pouring up the impressions to create models or printing models or some other means of creating a reproduction of the information captured by the impression or scan. In order to pour up impressions, a MM is flowed into the impression with a creamy, pudding-like consistency, often using a vibrating surface or other means to reduce the amount of bubbles which can cause imperfections and/or voids, which is then allowed to harden.

Single arch impressions permit the operator to pour up the maxillary and mandibular impressions at one time but forming the model base often poses a challenge or at least the need to wait until the MM starts to gel so that it can be flipped over and set into a model base. Currently, dual arch impressions require additional time to pour up since only one impression can be poured up at one time. When pouring up any impression, it is important that the MM flow in a manner that captures all impression details and then allowed time to harden. Dual arch impressions, therefore require time for the MM to harden on one side before it is turned over to allow the fluid consistency of the MM to flow into the other impression to reproduce the detail. Turning a dual arch impression tray over while the MM is still fluid to pour up the second side will cause the fluid MM to flow out of the $1^{st}$ side and cause model distortions. One technique of pouring up dual arch impressions is to pour up one side of the impression and wait until the MM has completely set, and then pour up the other side, wait until both sides have hardened, separate the models, trim and flatten the models, then mix a second batch of MM and set one model on an articulator, wait for the stone to set and repeat the process with the opposing model. MM A second technique is for the operator to wait until the material that was flowed into the impression and into the articulator begins to set up and harden and then set the impression on the articulator, wait for the material to completely harden, and then repeat the process for the opposing arch.

In both the single and dual arch model pouring methods, the putty-like consistency of the MM often flows past the desired borders, hardens in time, and then requires trimming to remove in order to either create a clean model or articulate the models; a process which is a loud, dusty, messy, and time consuming. Additionally, numerous imprisoning trays, scanning, printing, pouring, pin/pinless indexing, articulating, etc products (hereafter "components") exist in the market which requires that any system designed to make this process easier has to accommodate various shapes/sizes that have to work together which has not been able to be accomplished and is the goal of this invention.

SUMMARY

Objects of the invention include to:

1. pour up single or dual arch impressions with one mix of stone, form the desired model base (orthodontic models, whitening models, crown and bridge models, etc) with pins or a pinless indexing, crown and bridge models without pins, study models, etc), and articulate the models if desired.

2. Pour up single or dual arch impressions in both the historic horizontal manner as well as the novel vertical orientation which provides additional features and benefits heretofore unobtainable via the conventional horizontal pour process.

3. Create a universal design that can accommodate components of different shapes and sizes which holds the impression pray in a certain position and/or creates a form or seal around the components to allow one mix of MM to pour up, form the model base, and articulate models if desired 4. Normalize an impression by using the impression tray border and/or impression material as one of the trimming dimensions.

5. Normalize an impression by using a common, repeating design of the object of the impression and forming and/or sealing around/within/above or below it with some type of forming/sealing agent/material, etc that will direct the MM to flow and harden in a desired design to help reduce excess, hardened, material which would then require trimming or may detract from the model presentation or workflow.

6. Reduce or eliminate the need to trim models.

7. Create adapter(s) that will allow components of varying shapes and sizes to work with the system rather than having to create a new system for each of the many variations of components on the market.

8. Achieve the above with a universal design so that different components from competing manufacturers such as but not limited to impression trays, articulators, pin/pinless indexing, etc all or most of which can be used with this system.

BRIEF DESCRIPTION OF THE DRAWINGS

Figures:

FIG. 3. Figure showing impression material (an example of SFPA) applied to stabilizing wings with supporting "after" images displaying steps of forming model.

FIG. 9. 2-D illustration of leak trap. A CMH that does not have a leak trap allows stone to seep through.

For reference, the following numbering applies

Figure 1:
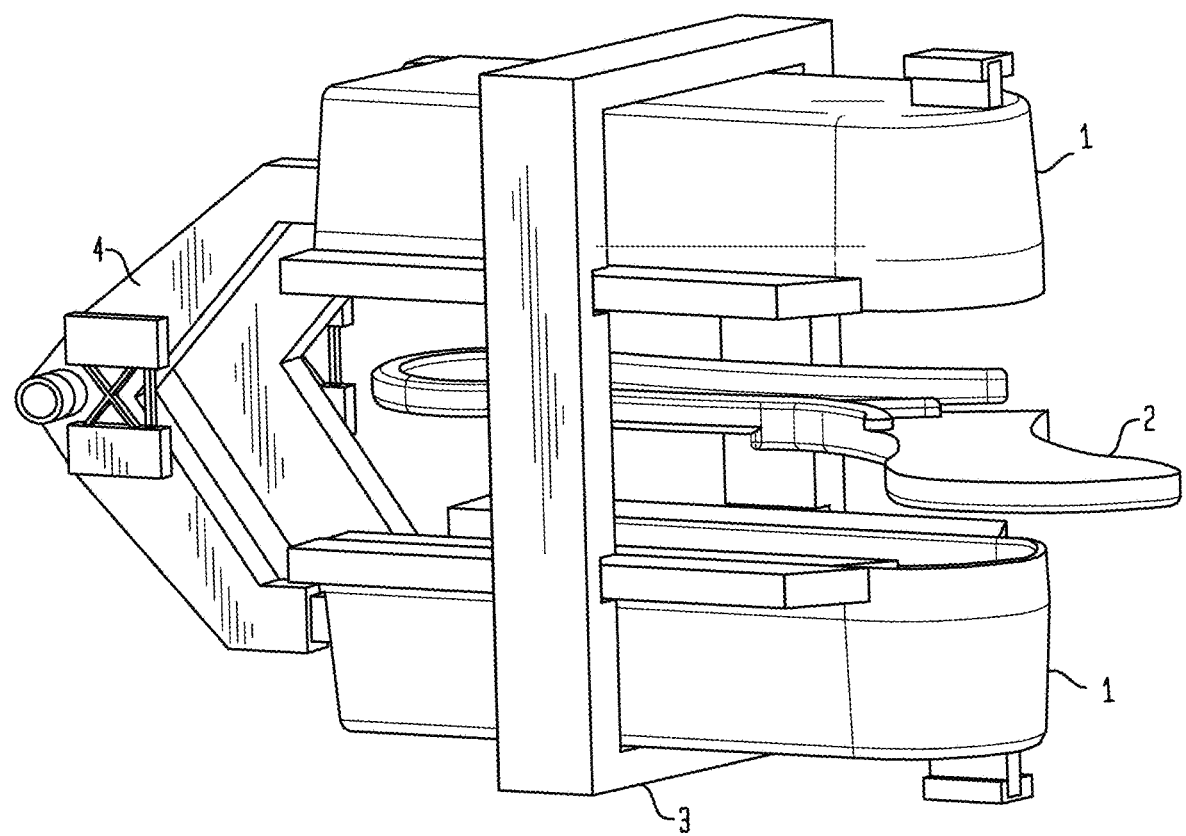
FIG. 1. Perspective view of impression tray system with articulator

| # | Description |
|---|---|
| 1 | CMH |
| 2 | Tray |
| 3 | SA |
| 4 | Ant |
| 5 | SW |
| 6 | SN |
| 7 | SM |
| 8 | SF |
| 9 | OOI |
| 10 | SFPA |
| 11 | IMPRESSION MATERIAL ON TRAY |
| 12 | POUR CHANNEL PC |
| 13 | OPCMH |
| 14 | T-LOC TRAY |
| 15 | HA |
| 16 | AW ADJUST WINDOW |
| 17 | AK ALIGNMENT KEY |
| 18 | AMB ANT MOD BASE |
| 19 | AMBC CAP |
| 20 | AMBM MALE |
| 21 | AMBF FEMALE |
| 22 | PIN SPACES |
| 23 | ANTI ROTATION |
| 24 | ARTICULATOR CONNECTOR AC |
| 25 | Second example of ARTICULATOR |
| 26 | SLM |
| 27 | COMPONENT 1 |
| 28 | STEP 1 |
| 29 | COMPONENT 2 |
| 30 | STEP 2 |
| 31 | CHH |
| 32 | VERTICAL ORIENTATION SUPPORTS VOS |
| 33 | CMH IN CHH |
| 34 | CMH IN CHH |
| 35 | CMH IN CHH |
| 36 | CMH IN CHH |
| 37 | CMH IN CHH |
| 38 | AA ALIGNMENT ADJUST |
| 39 | RA REMOVAL ASSIST STRIP |
| 40 | RA REMOVAL ASSISTING NOTCH |
| 41 | TRIM HEIGHT |
| 42 | SF HANDLE |
| 43 | SF TRAY |
| 44 | HOUSING BEAM HB |
| 45 | LEAK TRAP Male LTM |
| 46 | LEAK TRAP Female LTF |
| 47 | MM getting trapped in the Leak Trap |
| 48 | FILL LINE FL |
| 49 | VERTICAL FORMER VF |
| 50 | TONGUE FILLER TF |
| 51 | ORTHODONTIC POSTERIOR ANGLE FORMER OPAF |
| 52 | DRAFT ADJUSTMENT DA |
| 53 | Patient Identifying Tag PIT |
| 54 | PIT Anchor |
| 55 | PIT Writing Surface |
| 56 | PIT seated in CMH |

DETAILED DESCRIPTION

In one example of an embodiment for the field of dentistry, a dental professional selects a dental impression tray from the numerous ones on the market which have different designs, shapes, and sizes. Some trays have a thin handle, thick handle, handles emerging at different angles from the impression tray body, dual arch, single arch, quadrant, sextants, etc. An embodiment of this invention is to create a housing of some sort that can accommodate or adapt to the numerous tray configurations such that the desired model or articulated model can be created with one pour of MM which can be stone, plaster, resin, etc. Unfortunately, the various tray sizes and shapes makes it very difficult if not impossible to create one housing that accommodates all the different trays. A housing could be made for each tray but that would require numerous custom molds which are very costly, would require dental offices and labs to stock a housing for each tray, increases costs, and reduces efficiency An embodiment of this design creates universal housings that can accommodate at least 2 or more impression trays and components to increase efficiency, simplify the process of pouring up, forming a model base, and articulating dental models while also reducing costs.

Similarly, a dental professional may also select an articulator from the numerous ones on the market. Articulators come in an assortment of designs/shapes/sizes which makes it very difficult/impossible to create one housing that accommodates all the different articulators. A housing could be made for each articulator and impression tray combination, but that would require numerous molds which would be very costly, would require dental offices and labs to stock a housing for each tray, increases costs, and reduces efficiency. An embodiment of this invention is to create a universal housing that can accommodate or adapt to at least 2 or more articulator designs.

Additionally, a dental professional may desire for the model to have a model base design for the fabrication of sleep apnea/snore appliances, orthodontics, a whitening trays, crown and bridge, study models, etc and select a model base former from the numerous ones on the market. Model base formers come in a variety of designs/shapes/sizes which makes it very difficult/impossible to create one housing that accommodates all the different base formers. A housing could be made for each impression tray and/or base former and/or articulator combination, but that would require countless molds to accommodate all the combinations which would be very costly, would require dental offices and labs to stock a housing for each tray, increases costs, and reduces efficiency. An embodiment of this invention is to create a universal housing that can accommodate or adapt to at least 2 or more base model designs.

Historically, impressions in the field of dentistry have been poured up in a horizontal manner as follows: the MM powder is mixed with a liquid to create a fluid, the flowable material is poured into the impression in a manner that tries to reduce the amount of bubbles which can cause imperfections in the final model. The impression is then either placed horizontally on a horizontal tabletop until the MM hardens completely or the impression is placed horizontally on a horizontal tabletop until the MM has time to gel into a clay-like consistency and is then flipped over and placed on the tabletop to try to create a flat base or placed on top of a bolus of material that has already been placed on the tabletop to create a thicker base. All of this is done in the working in horizontal plane.

An embodiment of this invention utilizes a vertical pour technique (hereafter "VPT") to pour up dental models in the vertical plane instead of the conventional horizontal plane. The VPT creates a host of benefits including but not limited to: reducing the time required to wait for the MM to gel to flip the model, reducing the amount of bubbles in the model since the bubbles rise to the back of the model where the anatomy is not distorted, and allowing one pour of MM to pour up the impression, form the model base, and articulate the models if desired.

Impressions are taken to work with, capture, reproduce, etc a certain desired geometry/design/anatomy, etc., hereafter referred to as the "object of the impression" (OOI). This invention utilizes the OOI as the "normalizing" dimension (hereafter "ND"). It is cost prohibitive to create a housing for each tray and component (impression tray, model base former, articulator, adapter, etc) combination. Therefore by identifying the OOI, embodiments of this invention negate the need to adapt a housing that wraps around, attaches to, is suspended by, etc all the different dimensions of trays and components, and allows us to focus on the OOI for which we can then create a substantially universal housing. Thus this invention utilizes a housing, former, seal, etc designed to normalize the OOI of the impression so that it can be adapted to accommodate at least two or more combinations of trays, articulators, models, bases, etc of different styles/shapes/sizes rather than having to make one housing for each combination of components. Additionally, by utilizing the OOI, embodiments of this invention can also make a housing that surrounds the OOI and tray more efficient, beneficial, and accurate.

Another embodiment of this invention that works in both the horizontal and vertical planes are called stone flow prevention adapters (hereafter "SFPA"). The SFPAs are designed to help direct, reduce the amount of, or prevent the MM from flowing into unfavorable areas of the housing. The SFPAs can be made of a variety of materials similar but not limited to foam, putty, caulk, impression material, plastic, metal, etc and can be made of different sizes and dimensions or can be freely applied like using a caulk gun to seal around a bathroom sink. Embodiments of this invention combine, CMHs and SPFAs with the VPT to expand the universality of the number of components parts which can be accommodate by each CMH. For example, dental impression trays come in a variety of shapes and sizes for which a custom housing must be created to accommodate a custom model base former and a custom articulator. Applying and/or employing SFPAs to/with a housing using the VPT will allow one housing to work with numerous tray, base former, and/or articulator combinations which will be explained in detail below.

Another embodiment of this invention is the use of the SFPA to take advantage of a unique property of most MMs called the Model Material Thickness Tolerance (hereafter "MMTT"). The MMTT describes a property of each MM that requires a certain thickness to withstand the effects of force applied to the material. For example, some dental modelling stone requires over 2-3 millimeters of material in order to become strong enough not to fracture when force is applied. Therefore, this invention uses SFPAs to help either seal the OOI or at least reduce and/or direct the stone to be formed in a manner that is below the MMTT of dental stone so that when the force is applied to remove the dental model from the dental impression after the dental stone has completely hardened, any portion of stone below the MMTT of that MM will simply flake off or break away easily leaving a clean edge which requires little to no trimming.

An embodiment of this invention utilizes SFPAs applied to impressions to be poured using the VPT so that one housing can accommodate numerous combinations of trays, model base formers, articulators, and other components while employing the properties of the MMTT to create dental models with one pour of MM that require little to no trimming.

A dental professional uses dental impressions to create a variety of dental models for which the aforementioned combinations of unique shapes of impression trays, model base formers, articulators, etc may be utilized. Component designs in dentistry have varying sizes, dimensions and makes a universal housing-only design virtually impossible to use to create a seal to which MM can flow without the need to trim excessive material after it has hardened. An embodiment of this invention is to create a universal-ish casting model housing (hereafter "CMH") that can accommodate or adapt to at least 2 or more component designs.

FIG. 1 shows an embodiment of this invention which includes two, in this case, identical CMHs 1, a dual arch impression tray 2, a Stabilizing Arm 3 (hereafter SA), and an articulator 4 placed into the two CMHs.

Figure 2:
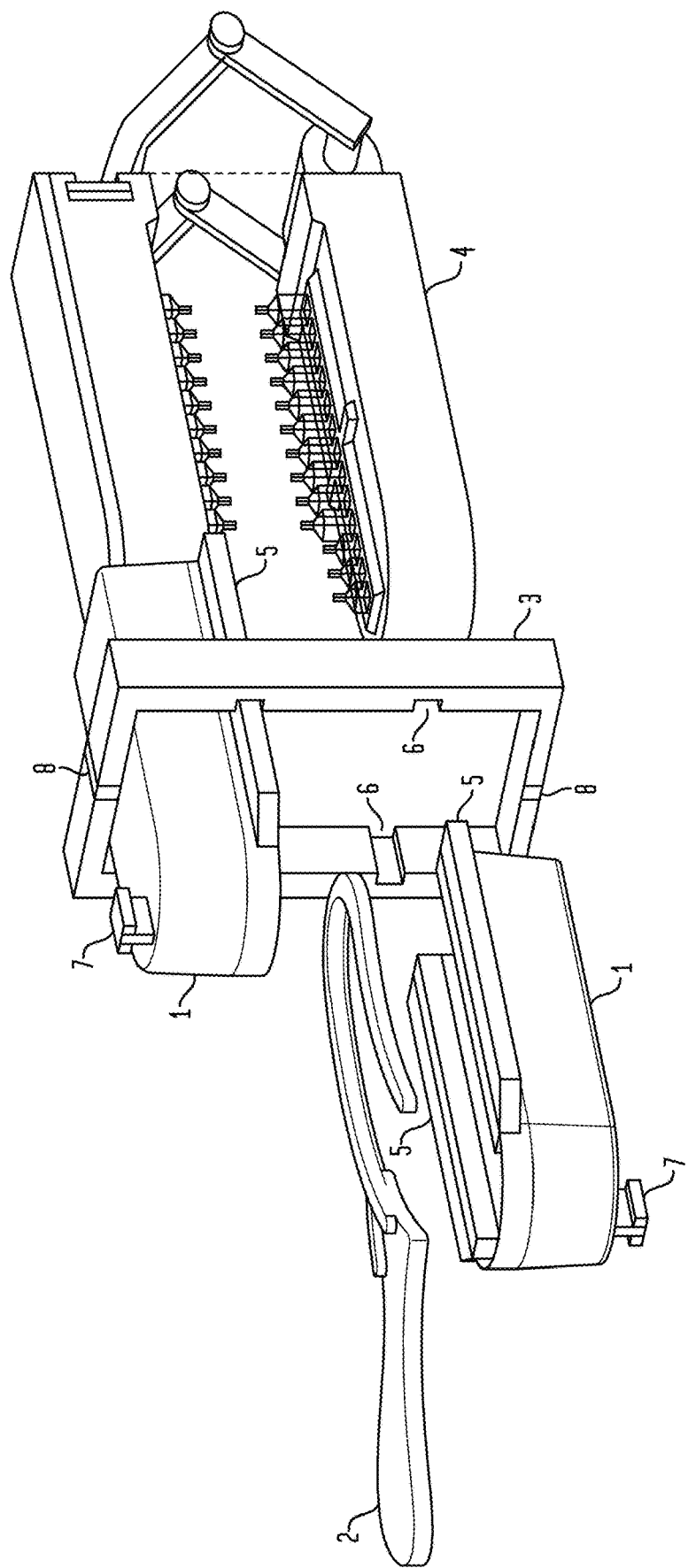
FIG. 2. Additional perspective view of system in partially-exploded diagram. Arrows indicate how the top CMH, SA, and articulator move forward into position shown in FIG. 1. An articulator at 4 slides into right side of figure.

FIG. 2 is an exploded view showing how an articulator 4, inserts into the back of the CMHs 1, which will surround the impression tray 2 once it is stabilized. Stabilizing Wings (hereafter "SW") 5 are an embodiment of this invention which engage the Stabilizing Notches 6 (hereafter "SN) located on the SA. Once the articulator has been inserted into the back of the CMHs 1, the articulator provides the posterior support that keeps the two opposing CMHs apart posteriorly and provides room between the SW and the CMHs for the impression tray. In order to keep the anterior portion of the CMHs at the proper distance such that the CMHs maintain a parallel relationship to each other, a SA 3 is placed posteriorly and slid anteriorly such that the SNs 6 in the SA pass over and around the SWs 5 which ensure that the CMHs 1 maintain their proper horizontal relationship. In order for the SA to lock in place, a Stabilizer Male 7 (Hereafter SM) located on the CMH 1 engages the Stabilizing Female 8 (hereafter SF) located on the SA 3, holds it in place, and prevents it from passing over the anterior end of and off the CMH.

The SA 3, SN6, and SW 5 work together to make sure the housings remain stable and parallel to each other or any set relationship until the MM has time to harden to help reduce/limit/eliminate model distortions which will most likely cause restoration failures which would require repeating the entire process starting with the patient impression.

The SA, SW, SN can be of different geometries to accomplish the object of an embodiment of this invention which is to stabilize the impression in a desired position such that the MM (ie dental stone, plaster, etc) can be poured into the impression and any components so that the resulting dental model has a desired relationship to the components and/or desired shape to the modelling material.

The rectangular design 9 in FIG. 3 is used to outline the OOI of this impression in order to normalize the impression which is an object of this invention. The perimeter of the OOI surrounds the portion of the impression which must be captured in the model to be created. FIG. 3 shows how the invention includes but is not limited to any design that encloses the OOI, the portion of the impression desired for reproduction in the model, so that the desired model geometry can be created. The OOI can be any shape or size such as but not limited to a horseshoe, square, circle, half circle, etc to normalize the impression and upon which or attached to a hat-like structure would be added in order to pour up the impression. The assemblies described in FIGS. 1 and 2 provide the support to which a SFPA like impression material 10 as shown in FIG. 3 can be applied around the OOI by placing it on the SWs 5 of the CMH 1 on one side and to either the dental impression tray 2 or the impression material in the impression tray 11 to either seal off or reduce the flow of MM through three sides of the hat-like configuration. FIG. 3 also shows an embodiment of this invention in which a hinged articulator 4 has been seated inside the two CMHs 1 and the start of the application of the SFPA 10 on one side of the SW of the CMH, which will then continue around the perimeter of the front of each CMH and onto the other SW to create a 3 wall seal around the OOI. After the SFPA 10 is applied to both of the CMHs, the impression tray will be set into the SFPA on one of the CMHs as the arrow indicates in FIG. 3. Next the SFPA 10 will be applied to the CMH which will then be closed onto the opposite side of the impression using the hinged articulator as a guide.

Figure 4:
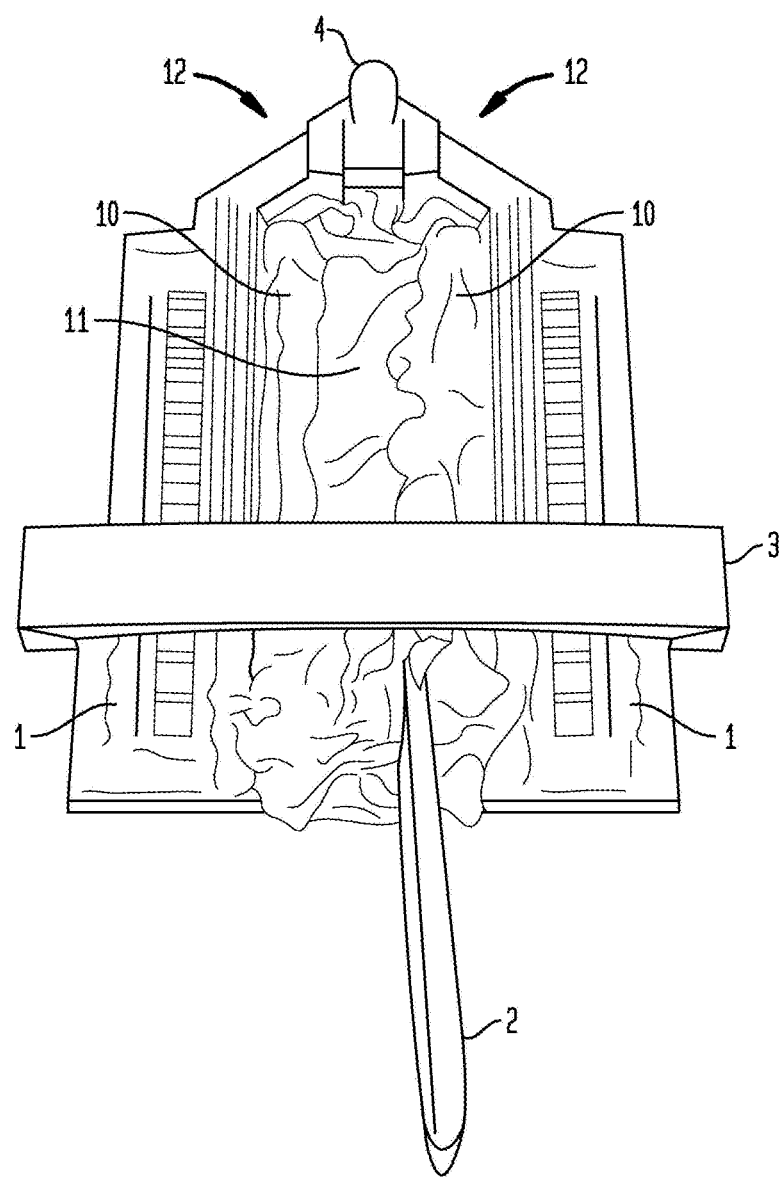
FIG. 4. Side view of formed model.

Next, the SA is inserted over the SWs and locked into place as illustrated in FIG. 2 and the assembly is rotated such that it is positioned vertically with the tray handle pointed downward as shown in FIG. 4 which is consistent with the VPT. Once the SFPA has been applied, the CMHs and the SFPA has sealed off 3 walls of the design around the OOI and/or the impression tray leaving only the posterior aspect by the hinge of the articulator open to receive the pouring of the MM which is called the Pour Channel 12 (hereafter "PC") shown in FIG. 4. The PC is accessible when the CMH is held in a vertical orientation which also allows the bubbles to rise to the posterior of the assembly during the flowing of the MM into the OOI so as reduce/eliminate imperfections in the models which is an embodiment of this invention.

Figure 5:
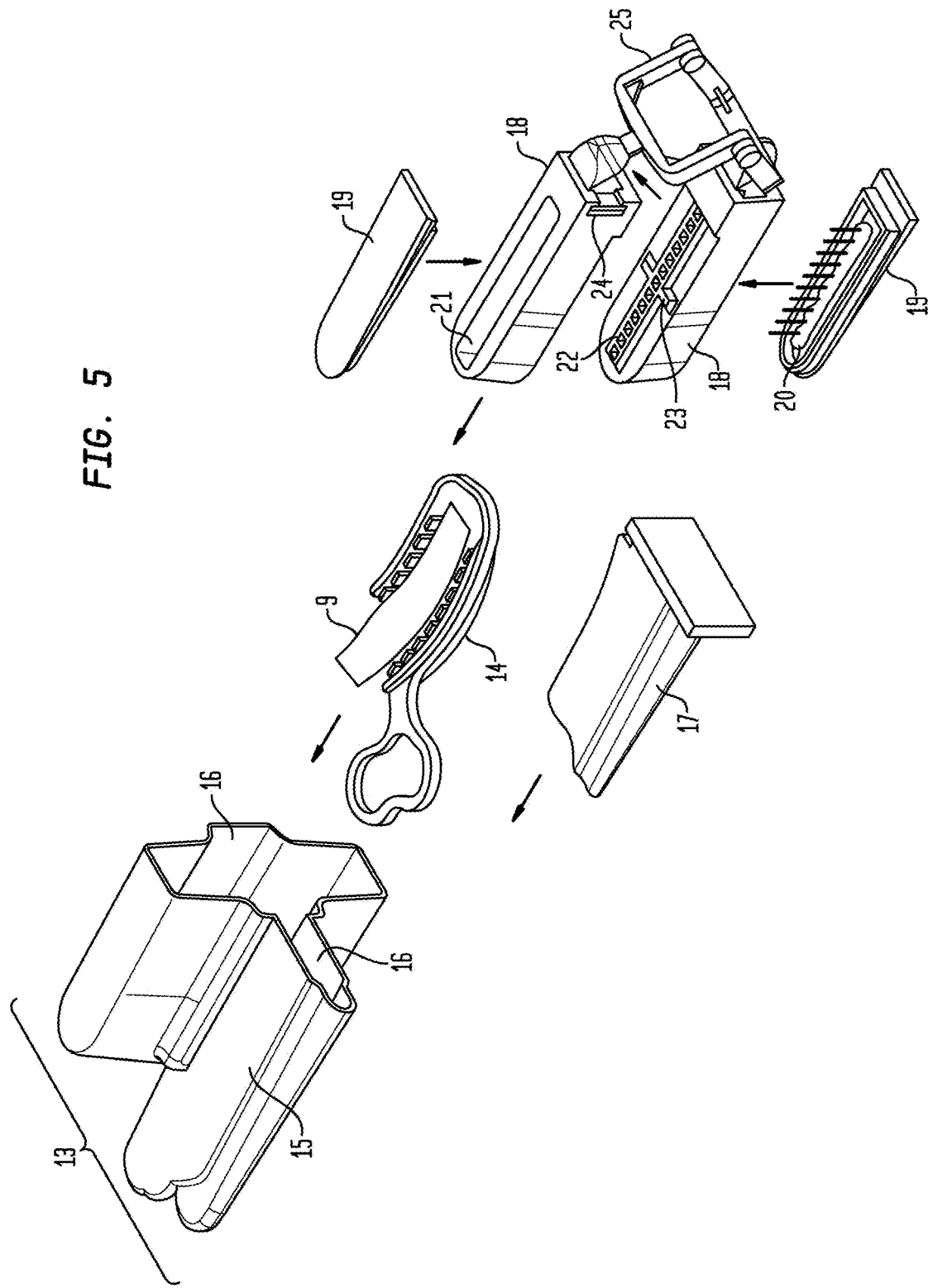
FIG. 5. Perspective, exploded view of tray modeling system.

FIG. 5 portrays a one-part design as an embodiment of this invention where the opposing CMHs are already fixed in position and which we call the One Part CMH (hereafter OPCMH) 13. Embodiments of this invention can work with both the CMH and OPCMH. This is an exploded view of the assembly showing the versatility of this invention and how it can accommodate numerous types of components. First, the impression tray 14 (note how the size and shape is different from impression tray 2 which speaks to the versatility of this invention) will be inserted into the OPCMH. Since no two impression tray handles are the same, the handle accommodator (hereafter "HA") is included as an embodiment of this invention. The HA 15 accommodates impression tray handles of varying sizes and shapes so that the OPCMH can accommodate several impression tray types which lowers production cost and reduces the need for dental offices and labs to stock numerous custom CMHs. Another embodiment of this invention, the SFPA, can be used to increase the universality by allowing the OPCMH and the HA to be larger which will allow more trays to fit. By designing the OPCMH and the CMHs with adjustment windows (hereafter AW) 16 in precise locations the user can place a SFPA like impression material, foam, and/or plastic etc into the AWs to help the tray fit better, reduce/prevent/direct the flow of MM so that there is no excess MM or if there is, it falls below the MMTT and easily breaks away when the model is removed from the impression tray. The use of AW and SFPA helps to reduce/prevent/direct the buildup of MM which would later harden and result in excess stone which may jeopardize the ability of the user to separate the model from the tray, cause the operator to have to grind or trim away excess stone, or cause a deficiency in the dental model; all of which increase time, expense, and mess.

The workflow is outlined in FIG. 5 as follows. The SFPA would be added to the AWs 16, then the tray 14 would be inserted into the OPCMH 13 and into or onto the SFPA that rests in the AWs. One concern of creating an OPCMH that accommodates several types of impression trays is that the trays may need to aligned so that the impressions are poured up along a plane that is centered in order for the OOI 9 to properly align along or over pins in an articulator for example. The alignment key (hereafter AK) 17 is an embodiment of this invention which would be selected from a variety of designs that best match the tray and then be slid into the HA and any surrounding SFPA to keep the impression tray 14 properly aligned. The AK can be reusable or disposable and can be made of different shapes and sizes so that the proper one would be used to adjust the alignment of each impression tray. The AK can even be made custom to each tray which would further increase the universality of the OPCMH. Since the AK can be made out of reusable material and would be less costly to make, it allows the OPCMH and CMHs to be used with a greater variety of components, thereby increasing office/lab efficiency, reduce costs, and reduce the need for costly inventory.

Next the user will choose the desired model base from a variety of components including but not limited to: a flat, short model base, an articulator with model pins, a pin less articulator, etc. FIG. 5 shows an embodiment of this invention which is an articulator model base (hereafter AMB) 18 without pins that fits precisely into the OPCMH. The AMB is unique because it is designed to be used in the VPT so that it does not fill with stone and prevent the use of the pin holes by utilizing another embodiment of this invention, the AMB cap (hereafter AMBC) 19 which fits snugly on the AMB to prevent stone from filling in the AMB when the impression is poured up using the VPT. Additionally, the AMB Male (hereafter AMBM) are projections off of the AMBC that fit into the AMB Female (hereafter AMBF) 21 and fill the pin spaces 22 so that stone does not fill those spaces during the VPT process. Uniquely, the AMBM projections may be removed by the user for the slots in which a pin is placed to allow the pin to sit securely while the AMBM projections fill the other pin holes which do not contain pins so that the stone does not fill those areas and make removing the model difficult or impossible. An additional feature of the AMBC is that it can be utilized to help correct a manufacturing requirement such as the need to add draft to the OPCMH during the manufacturing process which increases the chances of creating excess stone. Therefore, the anterior portion of the AMBC may be thinner than the posterior portion so that the AMBC properly increases in thickness to accommodate for the draft added to the manufacturing mold from the anterior to the posterior for the OPCMH and/or CMH.

There is also an anti-rotation feature 23 that was adapted to work with the VPT and added to the AMB which is an embodiment of this invention which can be made of any shape and acts to help stabilize the stone while it sets so that when it hardens, the model cannot rotate out of alignment on the AMB. The posterior portion of the AMB in FIG. 5 shows an articulator connector (hereafter AC) 24 which allows another example of the many articulators (hereafter A2) 25 on the market to be connected to it either before or after the MM is poured which saves the user time and increases the accuracy of the model's bite registration since it is a closed system instead of trying to articulate by hand. Once the AMBC's are placed onto the AMBs, the articulator is placed into the OPCMH around the impression and the assembly is ready to be poured up.

An example of a Rotational Adapter (hereafter RA) is 18 in FIG. 5, which is an embodiment of this invention which allows AMB to be multifunctional. Each AMB has four sides. AMBs can be made to have each side offer a unique design so that when rotated, they provide additional options such as but not limited to: the top could be an pin articulator base, the Right side could be a blank/flat surface, the bottom could be a channel index for a pinless articulator base, and the left side could be a second design for a pinless articulator base for implants for example. Each of the four sides can be customized to offer a unique feature all of which are designed to fit into a CMH and/or OPCMH to allow the AMB to be rotated as needed by the user to offer the desired base by simply rotating the AMB to expose the desired surface so that the adapter is rotated before joining the OPCMH in some manner as shown in FIG. 5.

In this example, a CMH as in FIGS. 1 and 5 is used to receive at least a partial dental impression of a dental patient's maxillary and mandibular oral anatomy, and optionally incorporate an articulator to register the patient's bite or how the maxillary and mandibular teeth come together. This exemplary CMH is used to create a model of what dental professionals hope to replicate through the process of taking an impression of at least a portion of a patient's maxillary and mandibular anatomy as well as the bite registration, pouring up the impressions, forming the bases and articulating the dental models so that the dental office, school, or dental lab can use the replica for a variety of reasons such as but not limited to: planning the patient's treatment, creating dental appliances such as but not limited to crowns, sleep apnea devices, snore guards, bridges, veneers, implants, cosmetic dentistry, inlays, onlays, removable partial dentures, custom trays, tooth whitening trays, mouth guards, night guards, etc.

The goal of the embodiments of this invention are to as little as one mix of MM to pour up the maxillary and mandibular, create model bases for, and mount both impressions onto an articulator in less time than it would take to pour up, create model bases for, and articulate a dual arch impression or two single arch impressions with less material, waste, time, need for trimming, and expense.

Among other benefits, embodiments may save a significant amount of time and materials per impression set because it may pour up the maxillary and mandibular impressions, create a proper maxillary and mandibular model base, and/or articulate the models with one mix of MM all in less time than it would take to accomplish the same using current methods.

Figure 6:
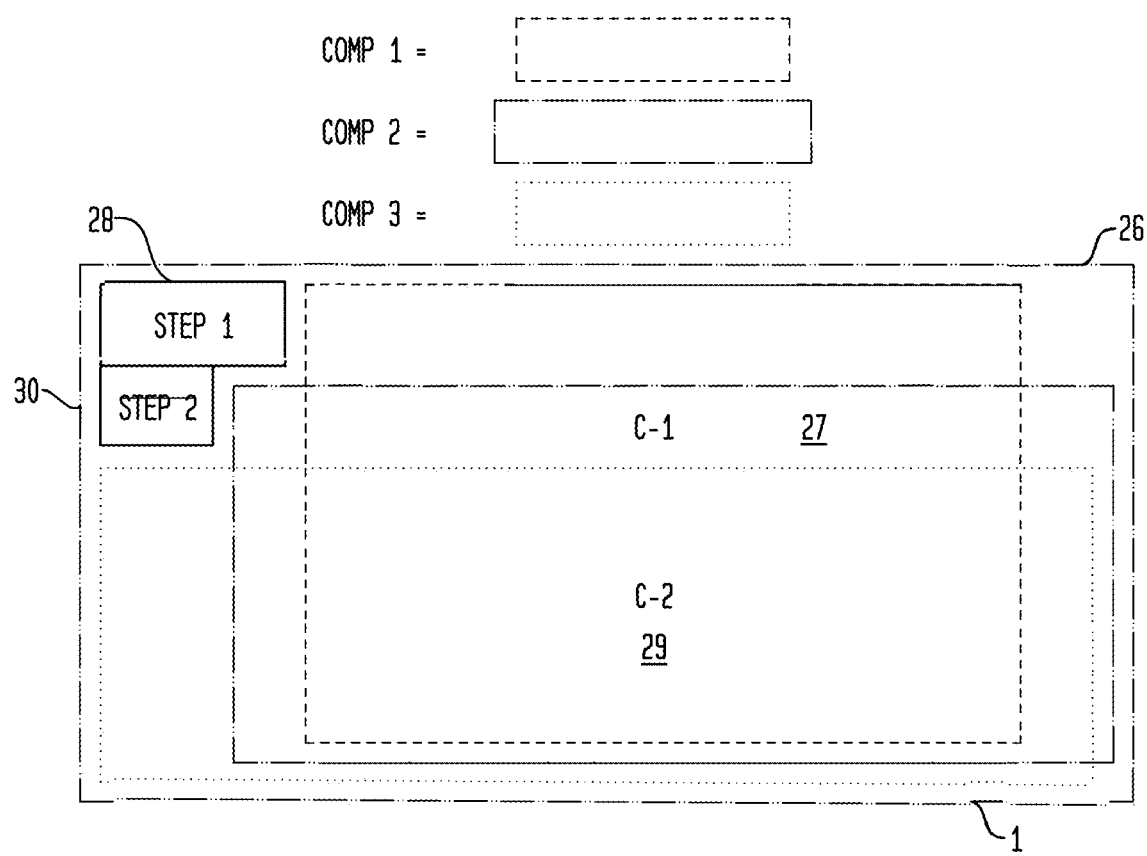
FIG. 6. Representation of seating and locking mechanism.

An embodiment of this invention takes advantage of specific designs to help increase the stability of connecting components so that they remain held in place during the modeling process. FIG. 6 shows an example of an Seating and Locking Mechanism (hereafter SLM) 26 which allows adapter and components of this invention to connect to, insert into, attach around or any other fashion become part of, the OP and CMH in such a manner as to allow multiple sized components to be utilized with the system rather than requiring one housing to accommodate each of the components which would require numerous configurations and/or housings of the embodiment of this invention. The SLM allows for the components to "lock" in place so that they do not move since any movement during the modeling and MM setting process can cause distortion of the models. The SLM can be used in an adapter to create seating steps and may include several steps or some other configuration to accommodate many components and lock them in place. FIG. 6 shows how a component 27 that is shorter but thicker can lock in place by having the component 27 slide into the CMH and becomes engaged by step one 28 which holds 27 tightly in place during the modeling process. Similarly, component 29 which is shorter and thinner can lock in place by having the component 29 slide into the CMH and become engaged by step two 30 which holds 29 tightly in place during the modeling process. The SLM provide the additional benefit of allowing more components to work with the system to further increase efficiency and reduce costly inventory.

A dental casting system, tray housing, former, sealant, and method for dental casting is further described. Embodiments of the system include a tray configured to hold single, dual, or other arch impressions of a patient's oral anatomy or impressions of any other kind in any other field, medicine, hobby, craft, etc. In the field of dentistry for example, these impressions comprise a negative impression of a portion of a desired geometry, in this example a patient's dental anatomy. The tray may have an anterior handle and may contain at least one nodule or protrusion along the buccal wall. For some trays, the handle will be located to the side, rather than directly before central incisors, some are thin and small, others are thick and large.

Figure 7:
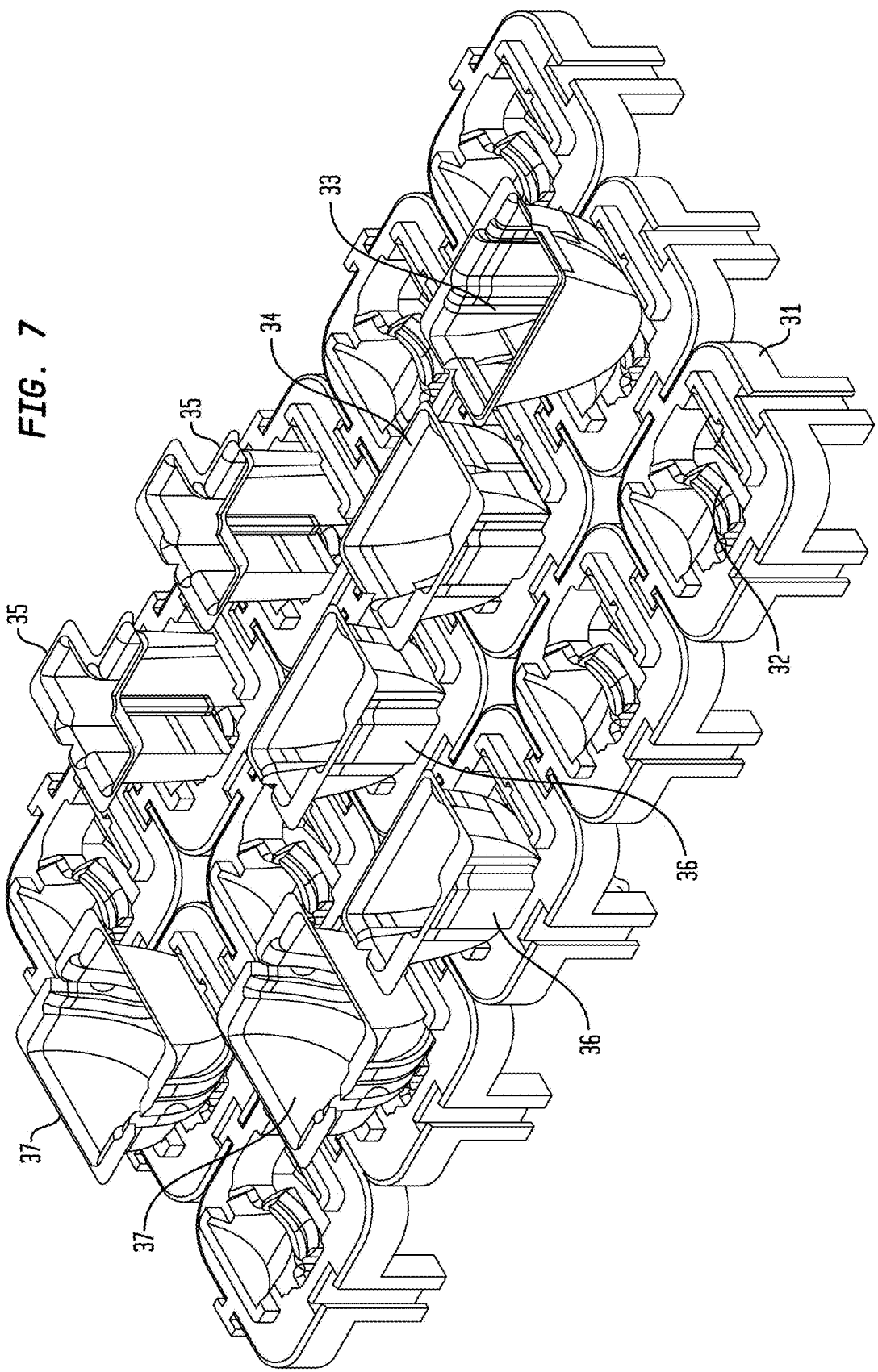
FIG. 7. Interlocking tray holding devices in column and row interlocking formation, receiving multiple tray cast housings.

In an embodiment of this system, a housing receptacle (CMH), may wrap around an articulator and/or allow an articulator or adapter to be inserted into the housing and then acts as a reservoir for MM, and receives the dental impression tray. In order to accommodate impression trays of various dimensions, the impression is trimmed in the normal fashion to remove any excess impression material which can interfere with the process. FIG. 7 shows one of the many embodiments of the current invention in which the operator is placing a SFPA (in this example, a ribbon of fluid material which can also be foam, impression material, gel, plastic, metal, etc,) to the stabilizing wings of the housing in this example (but can also be applied to any area surrounding the OOI including but not limited to the impression material, tray, etc) so that it can seal or reduce the amount of MM that can flow outside a desired geometry in order to pour up the impression and create a form of MM into a desired geometry while reducing excess. Alternatively, another means of customizing the space to accommodate the impression can be used such as but not limited to a SFPA material (foam, sponge, memory-type material, or even a form like metal, something pliable, rigid, malleable, thermoplastic, formable, plastic, etc) of some sort that surrounds the OOI of the impression with a larger housing that surrounds the impression and reduces the amount of excess MM MMor creates a desired shape.

FIG. 7 further shows how an operator may place a SFPA like a the ribbon of fluid material or other sealant type material on the Stabilizing wings described in FIG. 2 and around the perimeter of the OOI in order to help seal the impression within a housing which will then hold the MM until it is set. The stabilizing wings, or another design configuration, creates a platform to help normalize the impressions, creates a platform to hold the sealer, creates a platform to support the normalized impression while supporting the sealer to allow the material time to set, allows for adapters to be attached to accommodate different sized components such as but not limited to model base formers, articulators, impression trays, a cavity that is filled with a deformable material that will enwrap/envelope an impression and/or other component(s) etc. slide into, onto or otherwise adapt to or connect with the housing.

Additionally, the OOI or the housing can be filled with, supported by, or wrapped in a SFPA material which can be hard, soft, malleable or firm, memory type material, foam, gel, or material not yet invented, etc that accepts the components and/or an adapter and reduces the amount of excess MM by conforming to the shape of the component (tray, model base former, articulator, etc) and/or forms to, seals, or reduces the flow of excess material around the IOO so that MM may be poured and held in place until it is set or some other manner of creating the model is utilized.

FIG. 7 shows one example of an embodiment of this invention next to a dual arch impression and the application of the SFPA sealer to the stabilizing wing of the embodiment. The operator then lines up the impression over the stabilizing wings and superimposes the OOI normalizing red (in this case a rectangle) areas over the impression and seats the impression onto the housing and into the SFPA sealing material. Once the SFPA sealing material hardens, the process would be repeated for the opposing arch in this embodiment.

FIG. 4 is also an example of another embodiment which allows the SFPA to be applied to both arches to be sealed at the same time and takes advantage of the MMTT of the stone to help seal or at least prevent the stone from exceeding the MMTT of the material. The SFPA can be several different types of material including but not limited to a flowable material that hardens over time, a foam material into which the tray and impression material compresses to reduce/prevent the amount of MM that can flow past and takes advantage of the called MM thickness tolerance (hereafter "MMTT"). Using the SFPA to help prevent any stone from exceeding the MMTT allows the housing to accommodate more variations of dental impression trays, model base formers, articulators, and other components without which would require a custom housing for each combination thereof which would be a hardship for dental offices, schools, labs etc. to order and stock not to mention for a manufacturer to make as each combination require a costly manufacturing mold to produce.

Once the MM has set, the SFPA and the housing are removed to reveal the final articulated upper and lower models attached to the articulator in this example. Any excess stone that did not exceed the MMTT simply breaks or flakes away easily and reveals a clean model which requires little to no trimming.

After the MM is poured into the OPCMH or the CMH, it is imperative that the housing be placed in a stand to keep it vertically oriented until the MM completely sets. An embodiment of this invention is a casting housing holder (hereafter "CHH"). The CHH can be is unique because it:
  i. Can be a single design 31 or linked together as shown in FIG. 7.
  ii. Utilizes Vertical Orientation Supports (hereafter "VOS") 32 which holds each of the numerous CMHs in the proper vertical position so that the MM sets in the proper vertical orientation instead of causing the material to slump or drift to one side making the model lopsided. FIG. 7 shows how 5 different CMHs 33-37 are held in the proper position due to the 5 unique VOS 32 design incorporated into the CHH as an embodiment of this invention.
  iii. The VOS 32 design also allow the bubbles that are often incorporated in the MM during the mixing of the powder and liquid together to float or rise to the top of the CMH which by design is a part of the model in which bubbles will not be a problem. For example, the bubbles could be rise or float to the back of the model which helps reduce the bubbles from being located on important parts of the model which can cause imperfections or failures which would require the entire process to be repeated.
  iv. Unique VOS designs allow the CHH to accommodate several CMH designs so as to create a more universal system which prevents the need to create one CHH for each CMH which would cost more to make, would take up more space in the labs and offices which are typically small to begin with.

Another embodiment of this invention allows 2 smaller CMHs and OPCMHs to fit into one CHH while a handle and its receptacle in the casting housing maintains the impression tray in a predetermined horizontal and vertical orientation to produce the proper dimensions of the modeling bases during the dental modeling hardening and curing process.

The VOS shown in FIG. 7 #32, can also be thought of as a female receptacle which helps to maintain the impression tray in a predetermined orientation to produce the proper dimensions of the modeling bases during the dental modeling hardening and curing process and can be adapted to support unique and common aspects of various dental impression trays. The CHH can be made to accommodate a single or multiple CMHs or, in order to increase universality, several types of housings. The CHH also includes an interlocking mechanism which allows several CHHs to be connected in rows and/or columns. Additionally, they can also be stackable to create a smaller footprint for the user since most do not have much room in their modeling areas.

In embodiments applicable to general application for dental modeling, the housing can be made to accommodate any impression tray, model base former, articulator, model thicknesses/heights/widths/geometries, etc or any other desired component.

In embodiments of the invention, the CMH can be made of one or multiple pieces, either not leak, or minimally leak an acceptable amount of dental MM or may be designed to leak so as to help with the modelling process for example. Alternatively, to ensure against leakage of dental MM, the housing receptacle may be enclosed with a modeling putty or other desired material to seal an opening in the housing or have it applied in some fashion.

Figure 8:
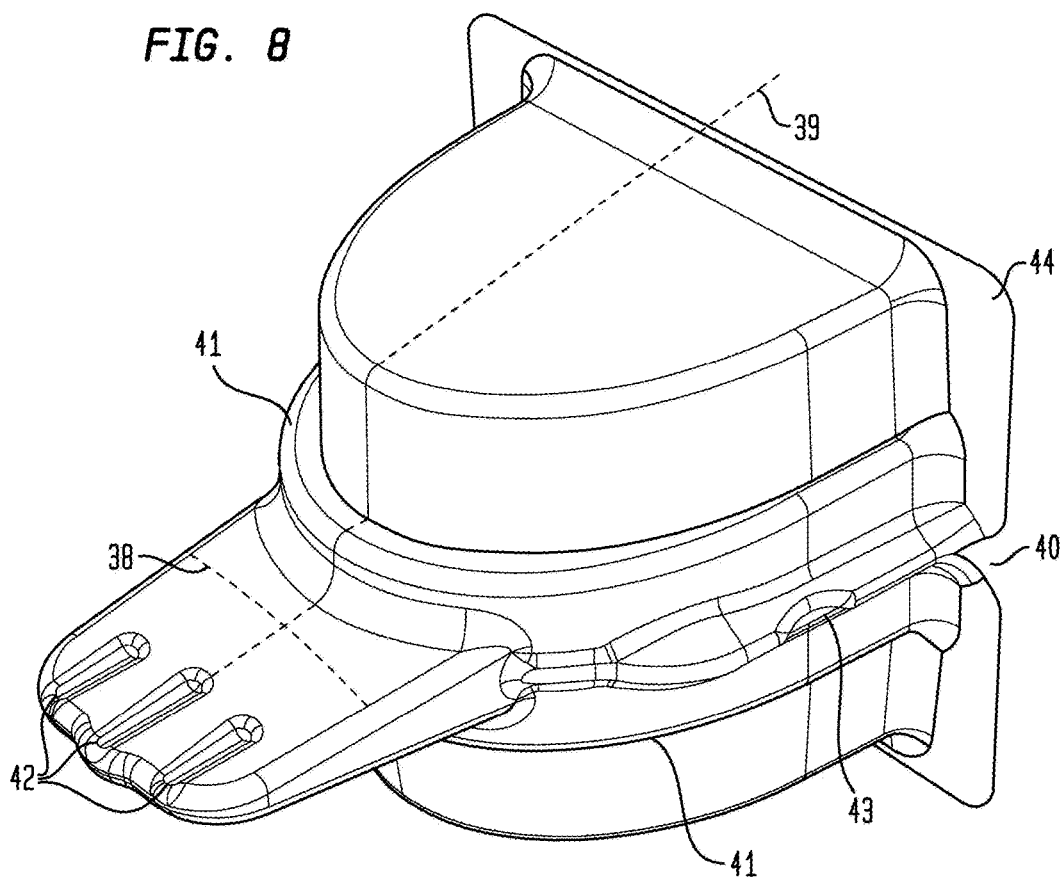
FIG. 8. Perspective view of impression tray housing with tear lines.

If necessary, when a full arch, anterior, or ¾ full arch impression is taken, for example, the handle and the midline of the impression should be centered in the tray housing. If the impression midline is mistakenly shifted while the dental professional is taking the impression, and the intended centerline of, for example, the handle shifts to the left or right of the impression tray center (i.e., around the yaw axis, if the mouth of the housing were the nose of a plane), it will cause the model and possible articulation to be offset either to the left of right because the housing is designed to keep the tray with impression, articulator (if present), and dental MM, aligned. For other impression tray types such as sectional and/or posterior designs, the midline of the impression should be aligned parallel to the midline of the articulator. If the operator notices that the midline of the impression is not properly centered in the impression tray, and for example, the alignment yaw axis shifted left or right, this could be corrected aligning the OOI laterally left or laterally right or up or down as necessary so that the handle can be positioned such that the midline of the impression is properly aligned with the midline of the casting housing. The area designated to accommodate the realignment of the OOI is called the Alignment Adjuster (hereafter "AA"). 38 in FIG. 8 shows an example of an AA on one embodiment of this invention. If the operator mistakenly captured an impression in which OOI is off center, the operator can cut the CMH at the AA, insert the impression tray and rotate the tray so that the OOI is centered, hold the tray in place, then use a SFPA to reseal the CMH where the AA was located. This is an important and unique feature which will save the user significant amount of time while preventing the need to have the patient return for another impression which causes discord, frustration, increases the expenses, and does not guarantee that the operator will properly align the OOI the second time. The AA provides the flexibility to make post appointment changes easily, accurately, and efficiently. The AA allows sections adjacent to the enclosure to be easily removed by the operator so that the impression tray handle may be adjusted so the midline of the impression can be properly aligned with the midline of the casting housing.

Once the MM has had time to set from its fluid properties to its hardened properties, it will have, by design, intimately adapted to the impression, the impression tray, and the CMH which makes the removal of the stone model in this example from the CMH difficult. In embodiments of the invention, sections of the CHM in FIG. 8 have a design included in the CMH which is called the Removal Assistant (hereafter "RA") examples of which include 39 and 40 in FIG. 8. The goal of the RA is to allow the CMH to be pulled away from the hardened MM without damaging the model which is a challenge due to the intimate engagement of the MM not only to the CMH but also within the impression and rigid impression tray. The RA can be any shape such that it aides in the removal of the CMH from around the model once the stone is set. #39 in FIG. 8 is an embodiment of the invention in which the casting housing may have at least one perforated edge and/or strip, for example on the outside of the superior, inferior, and/or lateral sections of the tray housing which can be easily lifted and removed from the CMH which causes the CMH to release and be able to me removed from the models after the curing and hardening process is completed by essentially sectioning the casting housing and allowing it to be separated from the cured/hardened dental models. 40 In FIG. 8 is another embodiment of the invention which uses a notch as the RA which includes a cut line which initiates the tearing process when lateral force is applied the CMH on either side of the notch so that the CMH can be torn and separated from around the dental model.

Additionally, 40 can act as a trim guide (hereafter TG) to help mark where the height of the impression has to be trimmed in order for the impression to seat into the CMH and/or OPCMHs. The user would align the impression tray handle with the RA 40 and mark the maximum height of the CMH or OPCMH as shown in 41 in FIG. 8 while making sure to hold the impression tray parallel to the CMH. Because each patient and impression is unique, excess dental impression material may overflow on the mandibular or maxillary sides of a single or dual arch impression tray, for example, and may overflow to lingual or facial sides of a tray. The TG may receive the tray's handle, buccal nodule(s), or other common or unique features in the female TG of the CMH to help trim away the excess impression material so that the impression fits into or is more easily attached to a CMH or OPCMH. The operator cuts away unnecessary material, which could otherwise impede placement of the impression tray in the CMH. Incorporating the TG into an embodiment of this invention eliminates reduces the need to create another component, reduces the armamentarium users must stock, and reduces the overall cost to the user.

A challenge of the design is to find a way to hold the impression trays in place so that they do not move when pouring up the impressions. Therefore, the Stabilizing Feature (hereafter "SF") has been invented to help hold the trays in the proper position during the modeling process. Some impression trays have common designs while others have unique designs both of which the SF will take advantage of to help hold the impression tray in place during the modeling process. In FIG. 8, 42 shows an example of an SF designed to take advantage of the fact that most dental impressions trays include a handle which allows the operator to carry the impression tray loaded with impression material into the patient's mouth. SF 42 is an example of three crimps which place downward pressure on the impression tray handle when the impression tray is inserted into the CMH while can also place lateral force on impression tray handles that are not wide enough to engage all three crimps to better help hold the tray in place. 43 is another SF that crimps or places slight pressure on the lateral sides of the impression tray without distorting the impression which further holds the tray in place. 43 is an SF that also creates a horizontal track into which the impression tray inserts which keeps the tray in the proper horizontal alignment.

It is common for patents to issue for which the manufacturing process may be too costly to produce or requires substantial changes to the ideal embodiments of the design. An embodiment of this invention called the Housing Beam (hereafter HB) overcomes such manufacturing hurdles with a unique design. In order for the CMH to work, the material from which it is made must be thick enough to hold its shape so as not to deform, buckle, bend, etc when the components are inserted and the MM is poured into the CMH while being thin enough that it can be removed from the models. During the prototyping of the preferred embodiment of this design, it proved difficult to find a material that accomplished both requirements. A material that was thick enough to prevent buckling was too thick to remove while one that was thin enough to remove caused buckling. Therefore, we invented the HB which is shown as #44 in FIG. 8. The HB is a collar that extends the posterior margin of certain CMHs that provides support to the long spans that typically buckled so that we could use a material thin enough to remove. These HBs proved to be a successful answer to a manufacturing problem that does not interfere with the overall workflow of the CMH, provides enough support to prevent the buckling, and even aides in placement both RAs 39 and 40 to permit the user to separate the CMH from the model after the MM has fully set.

Figure 9:
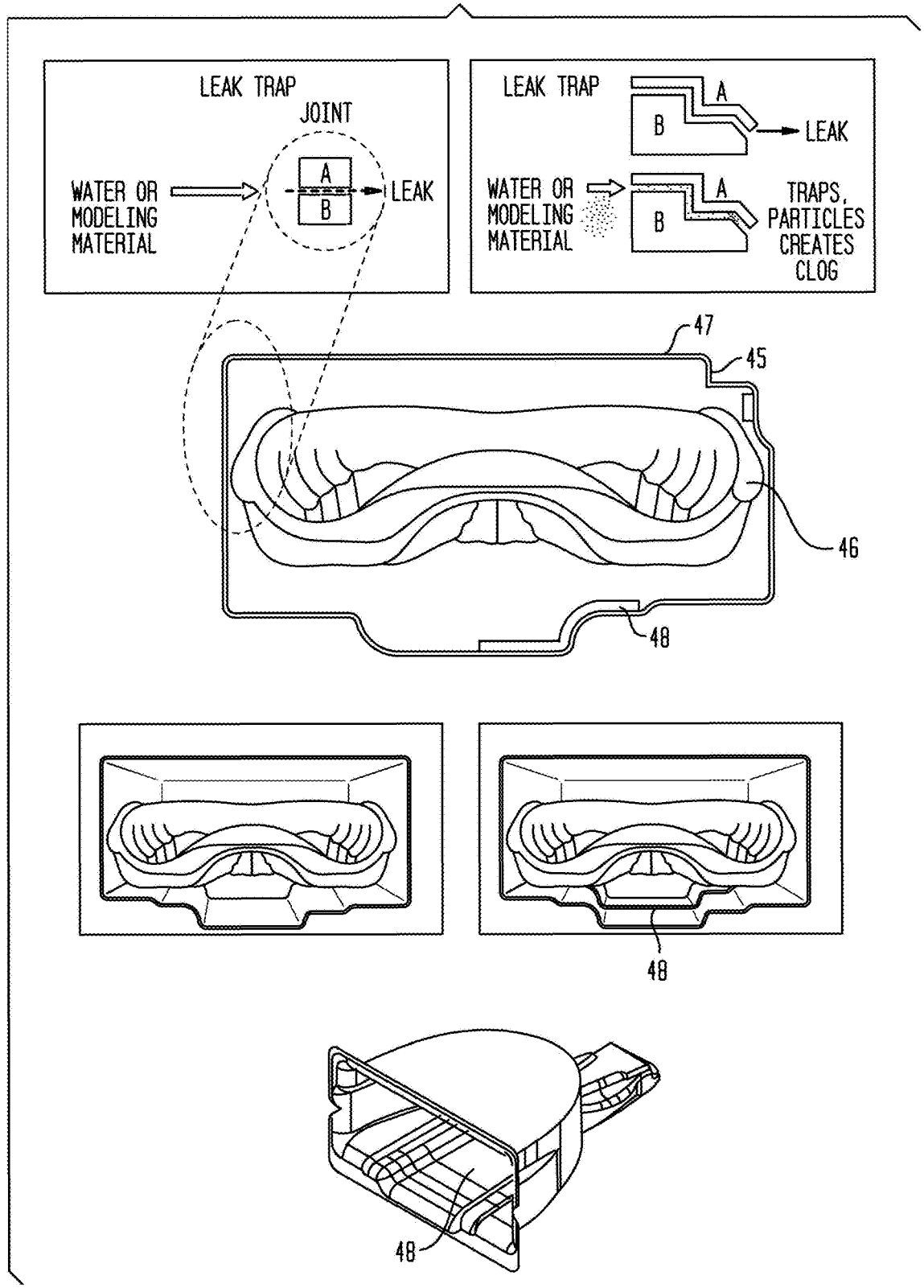

FIG. 9 describes an embodiment of this invention, hereafter referred to as the Leak Trap "LT) which allows the system to accommodate components of numerous geometries by creating a way to reduce or direct the leaking of modelling material. The MM can consist of many different ingredients but for the sake of explaining this embodiment, we will focus on the use of a dental modelling stone. Modeling stone starts off as a powder with which a liquid is combined and mixed to a flowable state which will set to a hard state in a pre-determined time based on the ingredients which can be as little as 60 seconds to as long as over 20 minutes. The LT takes advantage of the properties of these materials and slows them down from flowing in a way that causes them to get trapped and back up by utilizing specific geometry in a set pattern. Once this trap is backed up enough, the MM is prevented from leaking through a joint or leaks through to create a thin section of stone with dimensions less than the MMTT. This leak trap is an embodiment of this invention shown in FIG. 9 that helps to accommodate components which may or may not also use a SFPA to either plug a hole in the shell/housing/box or direct the stone to flow thinly through a geometry so that the operator can use interchangeable adapters while reducing/preventing the MM from leaking through the holes.

Knowing the MMTT of the MM allows this invention to utilize LTs as an embodiment of this invention to make the CMHs more universal by employing LTs to create housing geometries which can accommodate more components by keeping the MMTT below 3-4 mms in this example. Each material will have its own MMTT which must be considered when designing embodiments of this invention. FIG. 9 shows an example of an LT in an embodiment of this invention.

The border of the OPCMH creates the male side of the LT (hereafter LTM) 45 that matches up with the female side of the LT (hereafter LTF) 46 which is created after the excess impression material has been removed either by hand, using a TG, or using a trimmer to create a tight fitting leak trap. Any voids between the LTM and the LTF can be filled with SFPA to close the space or reduce the amount of space to be less than the MMTT of the MM. The MM is then mixed and flowed into the impression and housing. The MM flows into the impression and then either gets trapped in the LT created by the LTM as illustrated in FIG. 9 #47 and LTF or seeps through but is still less than the MMTT. Once the stone is set. Force is used to remove the hardened stone from the gel-like impression material which, since the LTs caused the stone to be less than the MMTT, any excess stone breaks away easily, leaving less excess and often a clean line that does not require trimming/model grinding. Combining the SFPA and LT features of the invention saves time, increases efficiency, reduces trimming, reduces/eliminates the noisy and dirty model trimming/grinding, and drastically increases the number of trays, components, and adapters that each CMH can accommodate.

The Leak Traps also help to seal the dual CMH embodiment of this invention described in FIGS. 1-3 so that the two halves can be sealed and act as the housing which wraps around an articulator FIG. 3 #4 into which CMH is sealed so that the OOI rectangles 9 align appropriately and allow for the impression to be poured up, the base formed, and articulated if desired with one mix of modelling material.

In embodiments of the invention, the CMH may be 1 or multiple parts, rigid, reusable, flexible, or disposable, etc, as needed. The CMH may be made partly or wholly of various materials, including but not limited to ethyl vinyl acetate, acrylic resin, shellac, thermoplastic, silicone rubber, poly (vinyl acetate-ethylene) copolymer clear thermoplastic; poly-urethane; or laminated thermoplastic, by way of example and not of limitation.

Another concern of utilizing this one pour technique is that if the operator overpours the MM into the CMH, it could overflow over the impression tray in excess of the MMTT which could cause the model to become entombed inside a wall of MM which would force the operator to chisel, grind, excavate the model from the excess stone which could cause the model to break which would result in the need to repeat the entire process. Therefore, embodiments of the system may further include fill lines (hereafter "FL") which can be seen in FIG. 9 #48 which show the operator how much MM to pour into the CMH so that they do not overfill. Since trays come in various shapes and sizes, we researched and identified three average lengths and assigned them L for large, M for medium, and S for small. #48 In FIG. 9 shows the fill lines with the markings of L M S which may be visible to the operator from both the inside and outside of the CMH so they know exactly when to stop. The FLs may also be located on other areas of the CMH and OPCMH including the lateral inside or outside walls to provide the user a better vantage point.

Figure 10A:
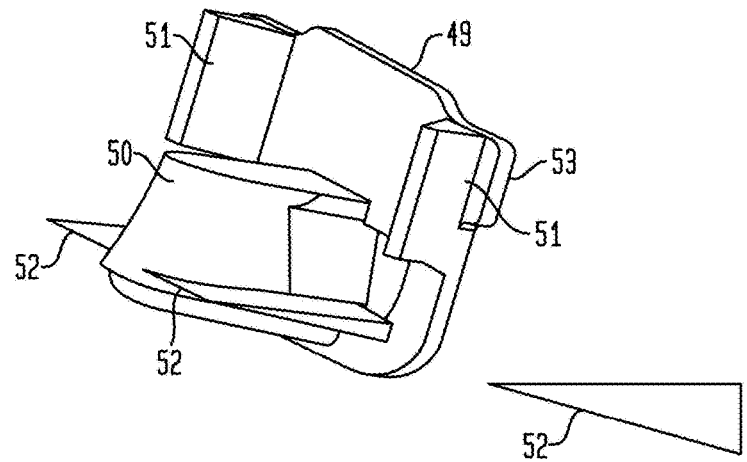
FIG. 10. Perspective views of component with tongue filler, vertical former, and draft adjustment.
Figure 10B:
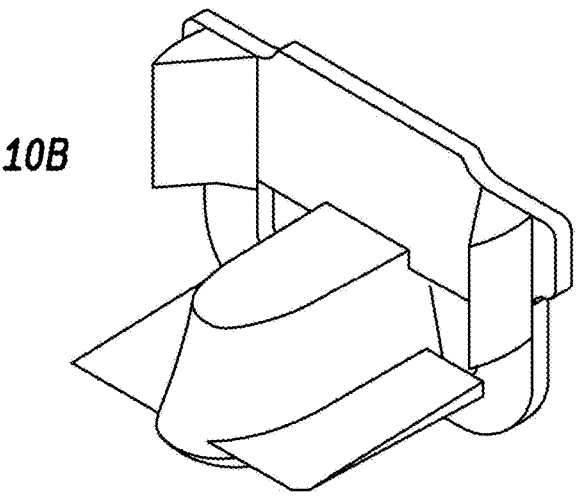
Figure 10C:
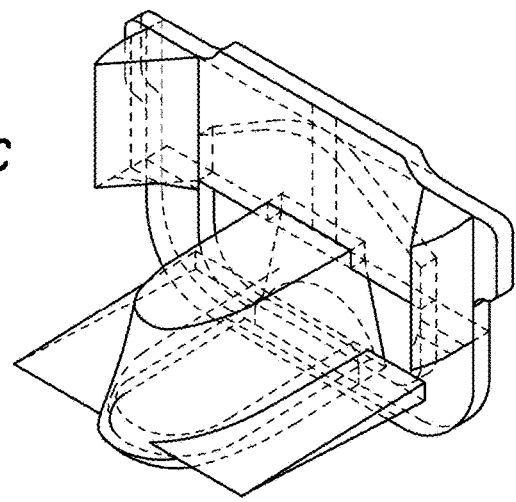

Since dental impressions have never been poured up in a vertical manner before, there are obstacles to overcome and opportunities to explore. The creation of the Vertical Former (Hereafter "VF") is an embodiment of this invention that overcomes obstacles and provides time saving advantages. FIG. 10 is an example of a VF 49 used to create orthodontic models. Orthodontic models have a unique geometry which currently requires a lot of time, expertise, and mess to create. The University of Washington School of Dentistry Department of Orthodontics describes the many steps required to create orthodontic models below:

i. Trim Maxillary Cast
ii. Grind the base of maxillary cast parallel with occlusal plane
iii. Grind the heel of maxillary cast perpendicular with mid-palatal raphe
iv. Mark the mid-palatal suture, and trim the posterior surface perpendicular to this, to a point just posterior to the hamular notch.
v. Using the 30° jig, cut the sides of the maxillary cast 60° to the base—do not overcut!!The center of the cut should be to depth of the vestibule
vi. Using the large 60° jig, cut the anterior of the maxillary cast at 30° to the base. These cuts should start at the canine and end at the midline and should be equal in length.
vii. Using the small 60° jig, cut the posterior angles of the maxillary cast at 120° to the base. These cuts should start be equal in length.
viii. Trimming the mandibular cast
ix. Using the wax bite, place the casts together in occlusion
x. With the base of the maxillary case on the table, grind the heel of the mandibular cast parallel with that of the maxillary cast
xi. place the mandibular heel on the table and grind the base of the cast parallel with the maxillary base
xii. with the models articulated, trim the sides of the mandibular cast at 60° to heel with the jig, as described above
xiii. keeping the models articulated in the wax bite, trim the heels flush and then trim the sides (at 60°) flush
xiv. round the anterior portion of the mandibular cast smoothly from canine to canine xv. lastly, articulate the models and trim upper and lower distal corners flush at 120°
xvi. Check Bases
xvii. The maxillary and mandibular models should sit in occlusion when placed on the heels, distal corners and sides
xviii. Lightly freshen up all parallel sides with casts in occlusion as needed
xix. Bases should be symmetric and ½" to ⅝" thick
xx. Finishing
xxi. Smooth scratched bases with wet/dry sandpaper
xxii. Fill any voids with a 50/50 mix of plaster & stone, re-sand smooth
xxiii. Remove fins of plaster on vestibules or bases
xxiv. Label models with last name, first name, age in years-months (e.g. 30-8), date the records were taken, and chart #
xxv. Allow to completely dry and soak in model gloss, if available An object of this invention accomplishes the aforementioned with one mix of stone with little to no trimming/grinding/polishing/adjusting by utilizing the VF. The VF in FIG. 10 overcomes the challenge of creating a tongue filler 50 by including a SFPA for the mandibular impressions which acts to fill the space occupied with the patient's tongue during the impression taking process so that the operator does not have to create and pack a tongue filler by hand on the mandibular impression which saves time and aggravation. An embodiment of this invention takes advantage of the vertical pouring of the impression and CHH vertical positioning of the OPCMH and CMH which allows the VF to be inserted into the back of the CMH such that the VF can create the left and right Orthodontic Posterior Angle Formers (hereafter "OPAF") 51 which has never been able to be done before in dentistry. By using the maxillary and mandibular CMH embodiments of this invention with the corresponding Maxillary and Mandibular OPAFs which have all the geometry outlined in section 42 above programmed into the design of the CMH and OPAF embodiments of this invention it is now possible for the first time ever to create orthodontic models with one pour of MM and little to no trimming, grinding, or polishing. This embodiment of the invention can save dental offices, schools, labs, etc, a tremendous amount of time, create beautiful models, and reduce the noise, risk to operator health by using a grinding belt which can injure their hands as well as lungs, ears, and eyes, and create orthodontic models in record time. Additionally, since the bubbles rise to the posterior of the model, the resulting models have less voids and bubbles. Furthermore, because the CMHs are enclosed during the hardening of the dental MM, it imparts a gloss on the model that otherwise would require an operator time to apply which poses additional health risks to their ears due to the noise, eyes due to the splatter, hands due to the grinding, and lungs due to the dust created.

The VF also provides the opportunity to overcome a possible manufacturing challenge created by the addition of a draft angle to the mold which may be required to increase the path of draw to allow the CMH to separate from the mold. #52 in FIG. 10 is the Draft Adjustment (hereafter "DA") which corrects the draft be adding a shim to the VF to prop up the impression tray as it rests in the CMH to allow the occlusal plane of the teeth in the dental model to become parallel to the top plane of the CMH.

Dental offices take numerous dental impressions each day. It is imperative that the patient's identification is properly transmitted through the impression taking and modeling process so that the patient's identification gets transferred from the impression to the dental model. Therefore, a patient identifying tag (hereafter PIT) is an embodiment of this invention. The PIT can take a variety of shapes and can be as simple as using a material to create the CMH and OPCMH which will receive a name written by the operator. The user would record the patient's name on the outside of each CMH used in the PIT which in FIG. 10 would be the back of the VF 53. Once the CMH is ready to be removed from the CHH after the MM has set, the operator would locate the PIT on the back of the VF 53 and transfer the name by writing it on the model.

Figure 11:
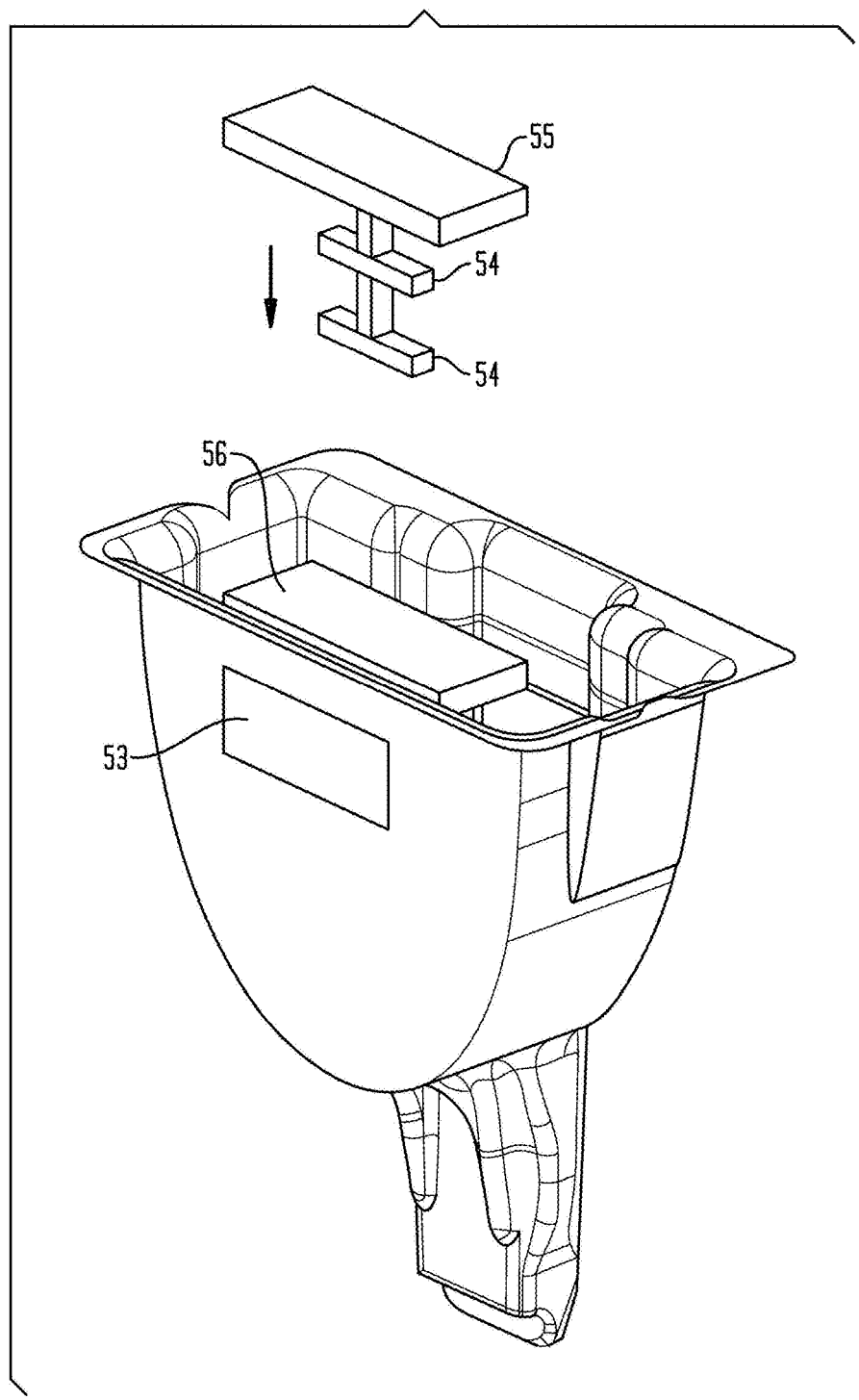
FIG. 11. Patient identifying tag representation and method of applying PIT to model.

Another embodiment of this invention is a PIT made out of a material that can record writing on its surface that is waterproof and strong so that it will not break during and after the modelling process as shown in FIG. 11. It can be made out of a variety of materials such as but not limited to plastic, paper, waxed paper, etc and have a variety of designs with some sort of an anchor 54 attached to a writing surface 55 as illustrated in FIG. 11. FIG. 11 shows an exploded view of how the PIT is inserted into the CMH. First the patient's identifier would be written on 55, then after the MM has been poured into the housing and the housing has been placed in the CHH, 54 would be inserted into the fluid MM until 55 is flush with the MM which is illustrated in 56 of FIG. 11 (or in an alternative design in which the PIT is linear rather than the perpendicular design shown, 55 of the PIT would be tucked out of the way of any articulator or components). Once the MM has set, the housing is removed, and the model is removed from the impression tray, 55 will be attached securely by the anchors 54 which has hardened within the MM.

The PIT overcomes the everyday challenges dental professionals currently experience during the impression taking and modeling process. First, the dental professional must record the name of the patient on the dental impression after the impression is removed from the mouth as soon as possible so as not to get the impression mixed up with others in the office. Often the dental professional will either write the name on a napkin and wrap it around the impression, on the impression tray itself, on a piece of paper that is transported with the impression. It then becomes a challenge to make sure the name is transported with the impression from the operatory to the lab and through the modeling process. The best current designs can offer is to rest the name next to the impression or on the impression tray until the MM sets and then transfer the name to the model. The problem is that this requires an additional step which may be overlooked and/or the user must find a flat surface on the model that will accept writing. Often, the model may not accept the markings from the writer, or the writing is blurry further causing frustration and confusion. Another concern is if the user writes on a surface that is then ground away, the name is no longer visible, and the patient's name is lost. The office experiences confusion and frustration if the name gets separated from the impression and is not transferred to the model which also may cause a dental restoration or appliance to be fabricated on the wrong dental model causing the office increased expenses, lost revenue which can antagonize patients.

The PIT provides the following advantages over the current technique. First, the PIT can be completed while in the operatory and immediately inserted through the hole in the front of most dental trays such that the anchor 53 holds it in place. Once in the lab, the user removes the PIT and places it beside the CMH, pours up the impression, then seats the PIT into the back of the CMH and sets the CMH on the CHH to allow the stone to set. The PIT never leaves the impression, the user only has to write the patients name once, the user does not have to remember to transfer the name to the model after removing the model from the CMH, and since no trimming/grinding is required, the PIT will always remain embedded within the model so that the patients name cannot be removed or lost.

Since the PIT is filled out and inserted during the modeling process, there will be no confusion as to whose models they are once they are removed from the dental impression which increase efficiency, reduces frustration, and eliminates the concern that a patients models will get lost. The PIT is another unique feature afforded by the VPT embodiment of this invention since the posterior of the models are accessible to the operator once placed in the CHH for the MM to set. Additionally, the PIT can be small enough to be used with the smaller dental impressions like the posterior dual arch impressions and wont interfere with the articulator.

The PIT can be designed in any manner. Another example of the PIT can be one in which the anchor 53 is perpendicular to the writing surface 54. This design allows the user to seat the PIT into the newly poured MM such that the anchor sinks into the MM until the writing surface sits flush to the MM so that the PIT does not stick out of the model.

Impression trays, articulators, base forming adapters, and other types of components of different brands and styles will fit into, around, on, within a casting housing of predetermined dimensions or of a universal design, leaving enough room for the impression material, a model forming base if desired, the articulator, or any other component if desired.

An impression tray will insert into the female component of the preferred embodiment of this invention. One or more posterior perches points may also fit snugly and provide further posterior support to provide a more stable fit for supporting the tray while pouring up the impression, and maintain the stable fit and proper dimensions during the curing and hardening process. A snug fit can also be obtained with a sealer or modelling putty to ensures that the modeling material is directed into the appropriate areas and will be restricted from flowing into areas of excess.

The articulator, components, or variables, can be added or removed in this invention to match the desired end goal of the dental professional and, since they are optional, provide numerous configurations to allow the dental professional to easily create the desired modeling combination of which there will be numerous possibilities. Possibilities include but are not limited to pouring up the impression(s) to create a dental model base, pouring up the impression(s) to create tooth whitening models with tooth whitening dental model bases, pouring up the impression(s) to create study models with minimal dental model bases, pouring up the impression(s) to create study models with full maxillary and mandibular dental model bases, pouring up the impression(s) to create orthodontic models with full maxillary and mandibular dental model bases and articulate them, to create inlays/onlays/crowns/bridges/implants, sleep apnea/snore devises, etc.

As the MM is poured into the invention, the invention is designed so that the a portion of the impression tray and/or any portion of the casting housing in which the impression tray is in contact with the CMH wall can be held against a dental model vibrator in order to help reduce bubbles, voids, and defects in the dental model.

Due to the predetermined casting housing size, which may be further limited by blocking variables, for example, the remaining room there is for the modeling material which will result in creating models with a desired mini-mal base, minimal reservoir depth, dimensions, and configurations known, expected and customary, or useful, to various dental professionals. Among other purposes, dental professionals may desire the casting housing to efficiently aid in the preparation of but not limited to creating crowns, inlays, onlays, implant components, bridges, veneers, mouth guards, removable partial dentures, custom trays, orthodontic models, etc.

Embodiments of a casting housing comprise a design that accommodates an articulator, impression tray, model base former, and MM, etc., leaving an opening for adding the MM. Since embodiments may be a single system, there are no seams to allow the material to flow out which provides solid, complete models. Additionally, the invention can be a single or multiple part system. Further, for many dental impression trays incorporating buccal nodules and casting housings with receptacles for buccal nodules, the open back and a tight adaptation creates dental models without any voids, a benefit when using a dental modeling vibration unit to vibrate the MM into the former as it vibrates the bubbles away from the dental impression material and to the surface of the MM where it cannot interfere with replicating the desired oral anatomy. Embodiments described herein show a few of the many different designs of this invention, however, there are many options for how many parts are used: single, 2-part, 3-part, etc, how the parts are sectioned: horizontally, vertically, off center, etc, whether there is one master former with custom adapters, several master formers of different dimensions to accommodate the desired outcome: minimal base, moderate base, etc, articulated/not articulated, etc, as well as where the MM enters the invention: from the back, top, bottom, multiple locations, etc. which may also include an outflow valve if desired.

A CMH may optionally be comprised of a male superior or inferior component, e.g., a maxillary component, which component securely snaps into the female counterpart of, for example, a mandibular component in order to keep the tray, formers, and articulator secure while also providing a casting housing for the MM or even a clam-shell design. Excess MM would be prevented from flowing outside of the housing by utilizing a MM catching trough that is created by tightly adapting the male component into the female component such that the MM cannot navigate into, through, and around the trough since the trough design is such that it catches and holds the MM.

As noted, the invention can have a built in stand feature to hold the MM in the proper orientation after the MM has been vibrated into the impression so that the MM can completely set in the proper orientation.

Dental offices often take impressions using single arch or dual arch impression trays for many procedures including but not limited to: crowns, bridges, inlays, onlays, veneers, implants, application of therapeutics, whitening trays, mouthguards, nightguards, study models, orthodontic models, custom tray fabrication, removable prosthodontic appliance fabrication/repair, sleep/snore appliances, delivery of medications, customized scenarios, etc. Embodiments of the invention may be customized to meet these demands by creating a customizable system that allows the user to create the desired modeling system. Generally, embodiments of the invention allow creation of discrete dental models, to concomitantly creating a range of modular impressions.

Procedures made more efficient by embodiments of this invention include but are not limited to crowns, bridges, inlays, onlays, veneers, implants, whitening trays, mouthguards, nightguards, study models, orthodontic models, custom tray fabrication, removable prosthodontic appliance fabrication/repair, sleep/snore appliances, delivery of medications, customized scenarios, periodontic/orthodontic, endodontic, pedodontic, general dental, and prosthodontic procedures, removable prosthodontic appliance fabrication/repair, etc.

This invention may employ interchangeable adapt-ers that allowing the accurate creation of the model base and/or articulation option desired including but not limited to:

| | |
|---|---|
| i. | Bleaching/Whitening trays |
| ii. | Orthodontics |
| iii. | Endodontics |
| iv. | Prosthodontics |
| v. | Periodontics |
| vi. | Geriatrics |
| vii. | Oncology |
| viii. | Xerostomia |
| ix. | Pedodontics |
| x. | Delivery of therapeutic, medicaments, supplements, fluoride, antibacterial agents |
| xi. | Study Models |
| xii. | Crown and Bridge |
| xiii. | Custom Trays |
| xiv. | Nightguards |
| xv. | Mouthguards |
| xvi. | Snore aids |
| xvii. | Sleep apnea Aids |
| xviii. | Custom dentistry/appliances/models/ |
| xix. | Crowns |
| xx. | Inlays |
| xxi. | Onlays |
| xxii. | Implant restorations |
| xxiii. | Implant abutments |
| xxiv. | Restorative restorations |

The above embodiments are provided for illustrative purposes, and the scope of the claims is not limited to these specific embodiments or examples. Various system limitations, elements, details, and uses can differ from those described, or be expanded on, and yet still be within the inventive concepts of the present disclosure.

What is claimed is:

1. A dental casting system configured to duplicate at least a portion of a patient's dental anatomy, the system comprising:
   a tray configured to hold an at least one impression of a patient's oral anatomy;
   the tray configured to receive dental impression material; the tray further comprising a handle; a casting housing for receiving the tray;
   the casting housing comprising an at least one female receptacle formed to accept a tray handle, the at least one female receptacle holding the tray maintaining proper dimensions between arches and the casting housing during a dental modeling material hardening and curing process, where the system allows the hardening and curing process to occur vertically,
   the system further comprising an at least one normalizing element,
   where the at least one normalizing element is an at least one tray border with trimming dimensions,
   where at least one section of the tray border directs formation below model material thickness tolerance (MMTT).

2. The system of claim 1, where the handle is an anterior handle and the female receptacle is an anterior receptacle.

3. The system of claim 1, where the handle is a posterior handle and the female receptacle is a posterior receptacle.

4. The system of claim 1, further comprising a flow prevention adapter.

5. The system of claim 1, further incorporating an articulator for insertion around or into the casting housing at a predetermined depth and a flow prevention adapter.

6. The system of claim 1, further comprising a shaping and cutting mold, where the tray is inserted into the shaping and cutting mold for identifying and removing excess dental impression material on the tray, where the shaping and cutting mold further comprises a stem receptacle.

7. The system of claim 1, where the casting housing further comprises an at least one perforated edge.

8. The system of claim 1, further comprising an interlocking holder for securing an at least one casting designed for casting in a vertical orientation.

9. The system of claim 1, where the at least one normalizing element is a sealing agent that directs and reduces flow in a desired design.

10. The system of claim 1, further comprising stabilizing wings to support the at least one impression through a normalization and pouring process.

11. The system of claim 1, further comprising a seating and locking mechanism designed to accommodate various components and hold them secure so that they will not impart imperfections into the modelling process.

12. The system of claim 1, further comprising a leak trap.

13. The system of claim 1, further comprising a labelling element on a tray housing.

14. The system of claim 1, further comprising a patient identifying tag (PIT) where the PIT accompanies an impression and is inserted into the casting housing.

15. The system of claim 1, where the casting housing is further designed to allow for a predetermined trim amount, where the predetermined trim amount of material is removable by use of a housing beam, where the housing beam is requisite to strengthen a wall otherwise unable to support the dental modeling material.

16. The system of claim 1, further comprising removable assisting strips and notches that allow a housing to be removed from around a model.

17. The system of claim 1, further comprising fill lines that identify amounts of material to use in a vertical pouring technique.

18. The system of claim 1, further comprising housing elements that are leak traps that reduce excess stone requirements and further reduce the need for trimming or grinding.

19. The system of claim 1, where a predetermined amount of stone used leaves excess stone no larger than MMTT.

20. The system of claim 19, further comprising an articulator model base.

* * * * *